United States Patent [19]

Ellingson, Jr.

[11] Patent Number: 4,879,151
[45] Date of Patent: Nov. 7, 1989

[54] INSERT STRIP FOR A FLOOR COVERING STRUCTURE

[75] Inventor: Chester W. Ellingson, Jr., Burnsville, Minn.

[73] Assignee: Reese Enterprises, Inc., Rosemount, Minn.

[21] Appl. No.: 202,255

[22] Filed: Jun. 6, 1988

[51] Int. Cl.⁴ .............................................. B32B 3/06
[52] U.S. Cl. ....................................... 428/53; 428/54;
428/67; 428/217; 15/215; 15/216; 52/181
[58] Field of Search ...................... 428/53, 54, 67, 217;
15/215, 216; 52/181, 177

[56] References Cited

U.S. PATENT DOCUMENTS

| Re. 32,061 | 1/1986 | Ellingson, Jr. | 428/52 |
|---|---|---|---|
| 3,334,456 | 8/1967 | Naka | 52/181 |
| 3,783,471 | 1/1974 | McGeary et al. | 15/215 |
| 4,029,834 | 6/1977 | Bartlett | 428/62 |
| 4,321,294 | 3/1982 | Naka | 428/217 |
| 4,381,324 | 4/1983 | Ellingson, Jr. | 428/58 |
| 4,631,215 | 12/1986 | Welygan et al. | 428/105 |
| 4,663,903 | 5/1987 | Ellingson, Jr. | 52/181 |
| 4,675,222 | 6/1987 | Berndt, Jr. | 428/53 |

Primary Examiner—Alexander S. Thomas
Attorney, Agent, or Firm—Leo Gregory

[57] ABSTRACT

This invention relates to insert strips for a floor covering structure for public walking areas such as in foyers of commercial buildings. The floor structure is made up of connected longitudinal sections, each section having a central longitudinal channel, a raised removable strip being disposed into each channel, to provide a walking surface and the strip having a relatively friction free underlying surface for an easy insertion into a channel and the same being arranged to be retained in the channel.

8 Claims, 1 Drawing Sheet

INSERT STRIP FOR A FLOOR COVERING STRUCTURE

BACKGROUND OF THE INVENTION

1. Field of Invention

This invention relates to an insert strip for a metal grille structure forming a walking surface in public areas.

2. Description of the Previous Art

Foot grille structures are in general use in public foyer areas and include customarily channels to receive insert strips to form walking surfaces. The strips are inserted by being pulled or pushed endwise into a channel from one end thereof.

Many such strips in use such as carpet strips have backing material and others are formed of a plastic material but it has been experienced that the insert strips in common use or of which there is any knowledge all appear to require considerable effort to be positioned within in a channel.

It is desirable to have such a strip as indicated which is relatively easy of installation or removal.

In U.S. Pat. No. 3,783,491 to F. L. McGeary, a carpet stripping is shown having such a backing to prevent it from being pulled out of the channel.

In U.S. Pat. No. 3,533,893 to F. W. Hartstein provides a tufted fabric strip having a backing of a laminate heat sealed to a backing strip of paper, jute or a plastic material.

In U.S. Pat. No. 3,676,280 to Seymour Sands there is disclosed a tufted carpet having a polymeric composition applied to its bottom surface.

SUMMARY OF THE INVENTION

It is a principal object of this invention to provide an insert strip for a floor grille which is readily installed in operating position or removed therefrom and which provides a non-slipping walking surface.

It is another object of this invention to provide a strip such as has been indicated formed of suitable plastic materials through a dual-durometer extrusion of such materials providing a suitable non-slipping walking surface and a fairly rigid substantially friction free underlying surface to seat into a grille channel.

More particularly it is also an object of this invention to provide an insert strip for a floor grille in which the upper or walking surface portion is an embossed surface to provide a relatively non-slippery walking surface and having a more rigid underlying layer portion which is sufficiently friction free to slip easily into a channel of said grille, said layers being the product of a dual-durometer extrusion.

These and other objects and advantages of the invention will be set forth in the following description made in connection with the accompanying drawings in which the reference characters refer to similar parts throughout the several views.

DESCRIPTION OF A PREFERRED EMBODIMENT

Figure 1:
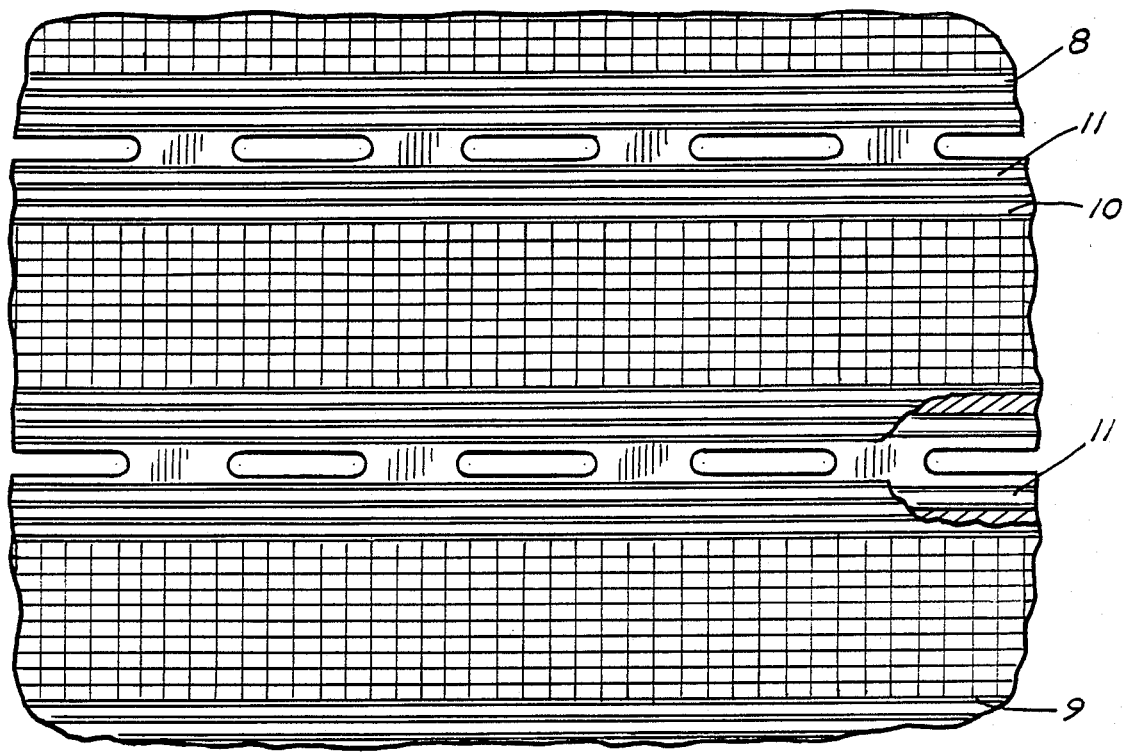
FIG. 1 is a broken view in plan of coupled floor covering sections with a portion broken away.

Shown in FIG. 1 is a representative grille type of floor covering structure comprising sections 8–10 joined by coupling members 11. The grille structure is commonly formed as an extrusion of aluminum material. Characteristic of such floor covering sections is a central longitudinal channel having disposed therein an insert strip forming a walking surface. The structure of the insert strip is the subject matter of the invention herein.

Figure 2:
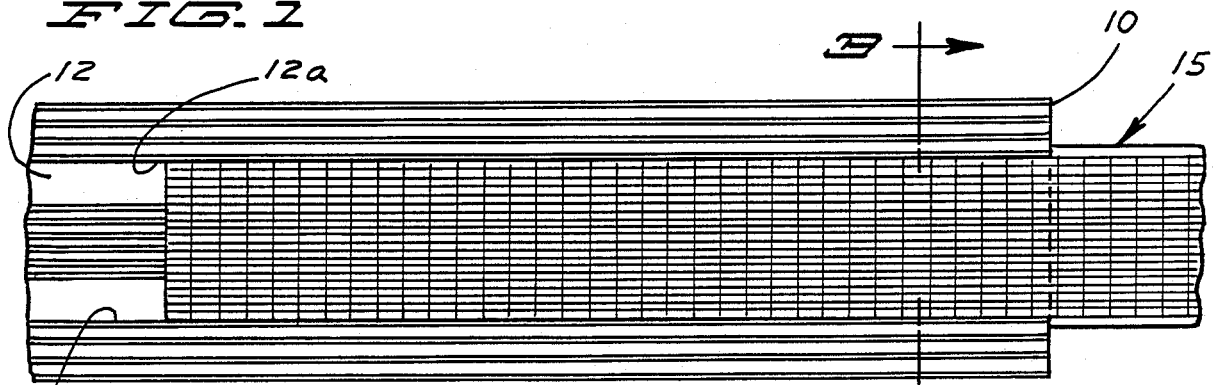
FIG. 2 is a broken view in plan of a single floor covering section showing a partially withdrawn insert strip.
Figure 3:
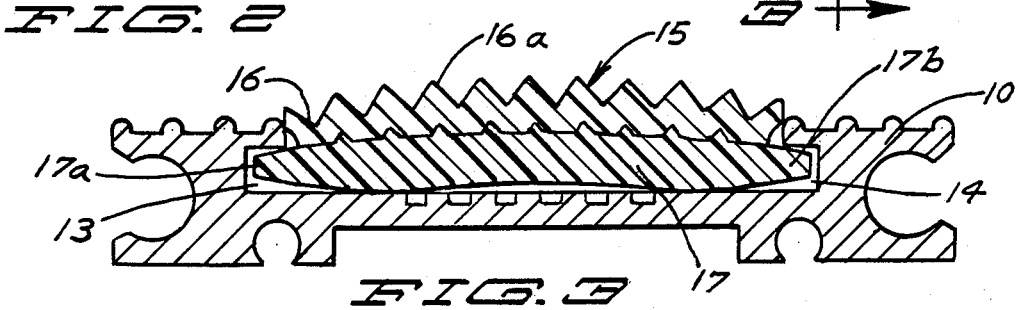
FIG. 3 is a view in transverse section taken in line 3—3 of FIG. 2 as indicated.
Figure 4:
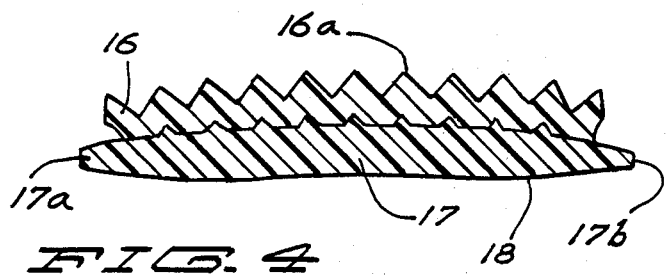
FIG. 4 is a cross-sectional view of the insert tread structure forming the invention herein.
Figure 5:
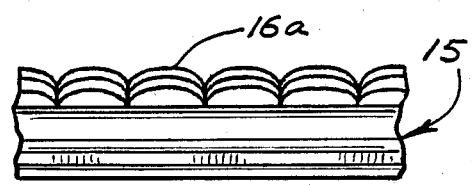
FIG. 5 is a broken view in side elevation of the structure of FIG. 4.

Referring to FIGS. 2 and 3, section 10 is shown having a central longitudinal channel 12 having therein facing grooves 13 and 14 at the sides thereof to receive the edge portions of an insert strip 15 to be described.

The insert strip 15 comprising the invention herein may be very suitably formed of an appropriate PVC compound. PVC compounds possess such versatility that they may be used in place of most thermo-plastics.

The strip 15 has two distinct parts or portions of which one is the upper tread or walking surface or layer portion 16 and the other is the underlying base layer portion 17. The tread surface portion may be of any desired color in keeping with the color scheme of the area and is extruded in a durometer which is somewhat yielding to provide a suitable walking surface.

The underlying or bottom surface layer portion 17 is co-extruded with the upper layer portion but it is of a more rigid or harder durometer such as to be bendable longitudinally but which flexes very little transversely and which provides what may be regarded as a slick underlying surface 18. The upper and lower layer portions are fused together in being co-extruded, said lower tread portion being of a harder durometer than said upper tread portion, as has been indicated.

When a strip has been extruded, in the embodiment here presented, the upper layer portion is indicated as being formed to have a plurality of spaced longitudinally extending ribs. To cause this surface treatment to become a suitable walking surface, the same is impressed by an embossing wheel. Here the embossing is indicated as being a cross hatching or causing a multiplicity of intersections to provide a non-smooth textured surface forming a multiplicity of transversely and longitudinally aligned inverted V-shaped projections 16a. These projections may take on other specific forms and may be otherwise aligned or they may be misaligned within the presented concept.

Thus there is formed a very satisfactory and attractive figured surface treatment which in addition to its attractive appearance provides a very satisfactory non-slipping walking surface. This surface treatment is found to tend to have a gripping action in being walked upon. It is to be understood that the inventive concept herein embodies various surface configurations upon the insert strip.

With the lower strip portion being of a harder durometer than the upper tread portion there is thus provided a firm base for the embossing wheel to impress a pattern into the upper tread portion.

The underlying or base portion 17 is formed of a clear non-colored material since it is not visible once installed and this results in a significant cost savings in eliminating the use of a color pigment.

With reference to said channel 12, the upper or tread surface portion 16 of said strip is of a width to fit nicely into the channel 12 between the outer perimeters 12a and 12b of the grooves 13 and 14. The underlying or base portion 17 is formed to have sufficient additional width to have its longitudinal edge portions 17a and 17b slidingly fit into and be received into said grooves 13 and 14.

Thus said strip 12 is readily and easily pulled or pushed into said channel 12 and is securely retained therein from being lifted out of said channel by its edge portions being disposed into said grooves 13 and 14.

It will of course be understood that various changes may be made in form, details, arrangement and proportions of the parts without departing from the scope of the invention herein which, generally stated, consists in an apparatus capable of carrying out the objects above set forth, in the parts and combination of parts disclosed and defined in the appended claims.

What is claimed is:

1. In combination with a floor covering structure of coupled sections, each section having a central longitudinal channel having transversely opposed facing grooves, an insert strip in combination with said channel, said strip comprising
   an upper layer portion formed as an extrusion of a fairly hard durometer plastic material,
   an underlying layer portion of a durometer harder than that of said upper layer portion and co-extruded therewith,
   said upper layer portion having a width to extend across the width of a channel of the floor covering section,
   said underlying layer having a width extending beyond each side of said upper layer portion to project into grooves formed at each side of said channel,
   said underlying layer portion having a substantially slick friction free surface, and
   said upper layer portion having formed into its upper surface portion a figured surface treatment.
2. The structure of claim 1 wherein,
   said upper layer portion is formed of a suitable PVC compound to have a firm yielding surface.
3. The structure of claim 1, wherein
   said underlying layer portions being formed of a suitable PVC compound of a hard durometer providing a relatively friction free bottom surface.
4. The structure of claim 1, wherein
   said underlying layer portion has a durometer sufficiently harder than that of said upper layer portion to provide a firm base for embossing said upper layer portion.
5. The structure of claim 1, wherein
   said underlying layer portion is colorless.
6. The structure of claim 1, wherein
   said surface treatment comprises a multiplicity of projections.
7. The structure of claim 1, wherein
   said upper layer has formed thereon a plurality of spaced longitudinally extending ribs, and
   means intersect said ribs forming a multiplicity of projections.
8. The structure of claim 1, wherein
   said underlying layer being transversely substantially inflexible.

* * * * *